United States Patent [19]
Alderfer

[11] 3,826,297
[45] July 30, 1974

[54] RADIAL TIRE CARCASS

[75] Inventor: Sterling W. Alderfer, Akron, Ohio

[73] Assignee: The Steelastic Company, Akron, Ohio

[22] Filed: Oct. 26, 1972

[21] Appl. No.: 301,189

[52] U.S. Cl. ............................. 152/354, 152/362 R
[51] Int. Cl. ......................... B60c 9/08, B60c 15/06
[58] Field of Search... 152/354, 356, 362 R, 362 CS

[56] References Cited
UNITED STATES PATENTS

| 1,433,008 | 10/1922 | Hawley | 152/362 R |
|---|---|---|---|
| 2,966,933 | 1/1961 | Boussu et al. | 152/362 R |
| 3,072,171 | 1/1963 | Drakeford et al. | 152/362 R |
| 3,240,250 | 3/1966 | Frazier | 152/354 |
| 3,386,486 | 6/1968 | Kovac et al. | 152/354 |
| 3,682,222 | 8/1972 | Alderfer | 152/362 R |

FOREIGN PATENTS OR APPLICATIONS

| 1,127,521 | 12/1956 | France | 152/362 R |
|---|---|---|---|

Primary Examiner—M. Henson Wood, Jr.
Assistant Examiner—Robert Saifer
Attorney, Agent, or Firm—Hamilton, Renner & Kenner

[57] ABSTRACT

The radial tire carcass disclosed has a pair of bead sections and at least one reinforced body ply functionally gripped thereby. Each bead section incorporates one or more bead assemblies comprising a bead ring and a reinforced radially oriented flipper portion anchored to the bead ring. The flipper portion overlies the body ply in contiguous juxtaposition, and the reinforcing means in the body ply terminates along the radial extent of the bead assembly. Because the reinforcing means in the flippers are wholly independent of the reinforcing means in the body ply, the transfer of forces therebetween is occasioned solely by virtue of the aforesaid contiguous juxtaposition. The method and apparatus for making such a tire assembles a first pair of bead assemblies on a building drum and then builds a first body ply by successively depositing a plurality of reinforced elastomeric strips about the outer surface of the building drum. The deposited strips are stitched to each other and to the bead assemblies. The relationship of the successive strips with respect to each other is predetermined by coordination of the degree of angular displacement through which the drum means is indexed to receive the successive deposits of strips thereon in conjunction with the width of the successive strips. Additional bead assemblies and body plies as well as chafer strips, belts, sidewall stock and tread stock may be applied, if desired.

10 Claims, 12 Drawing Figures

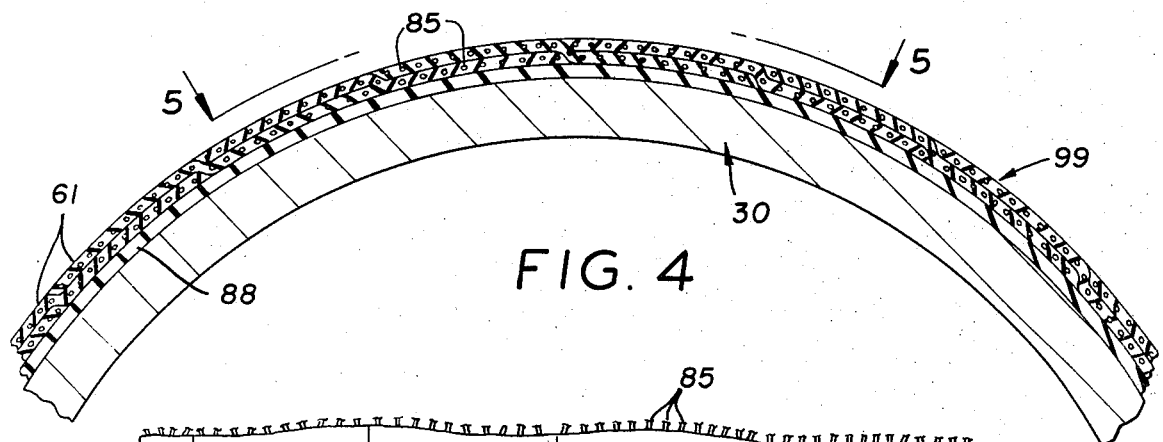
FIG. 4
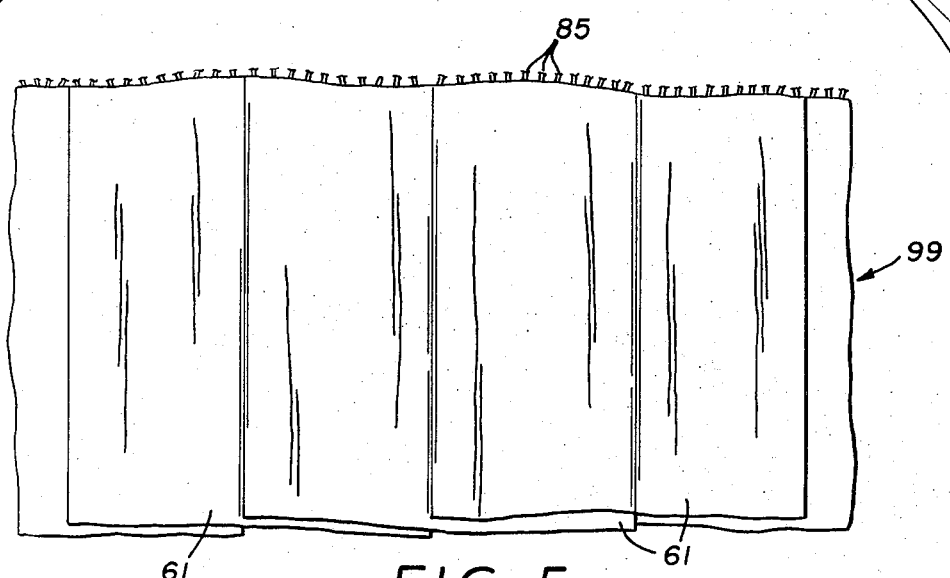
FIG. 5
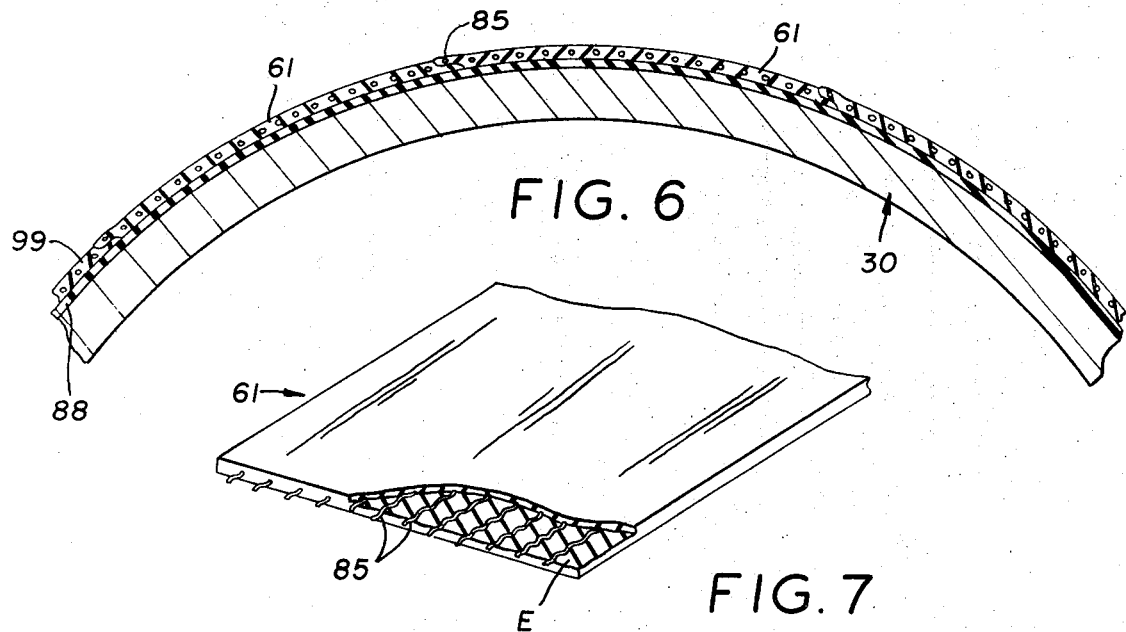
FIG. 6
FIG. 7

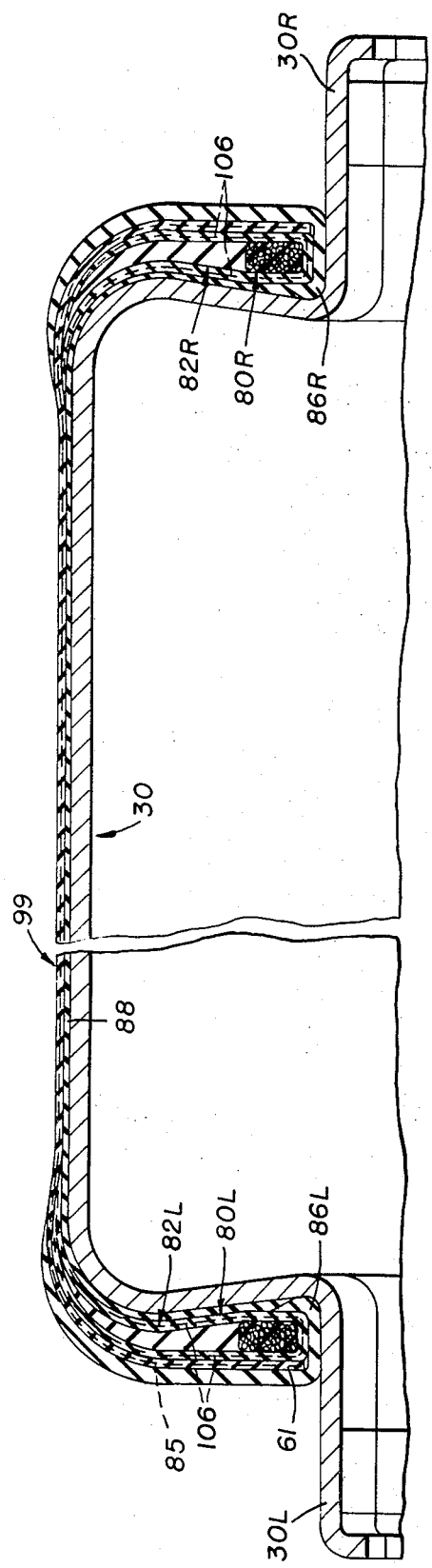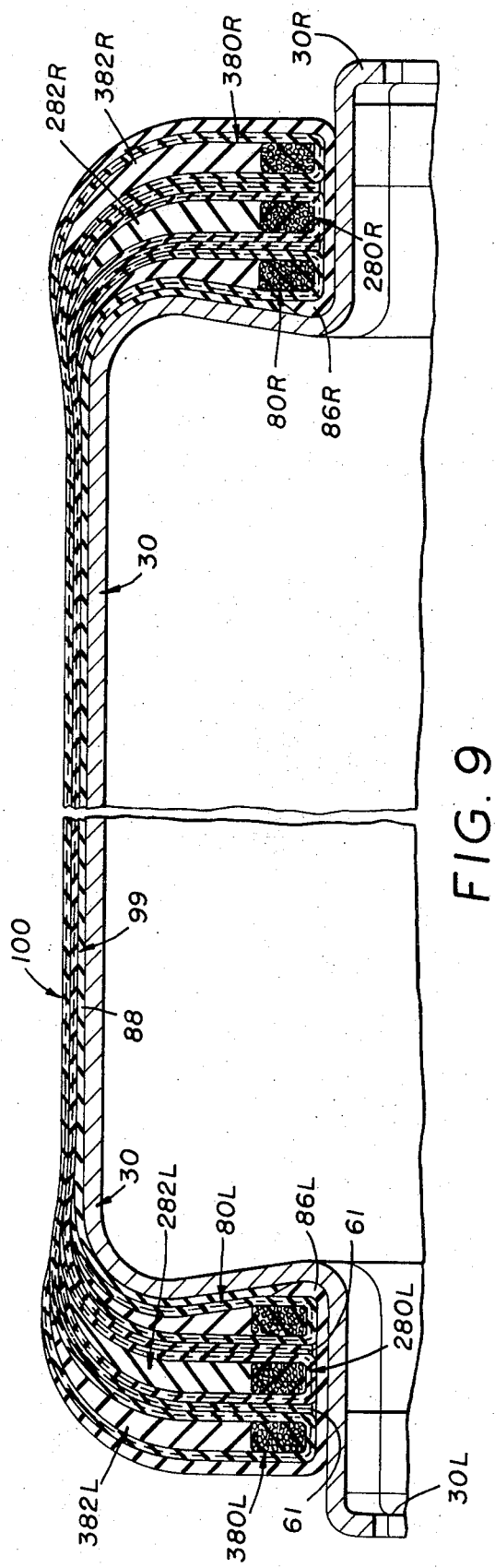

RADIAL TIRE CARCASS

BACKGROUND OF THE INVENTION

The success of the radial ply tire in Europe has engendered a revolution in the domestic tire industry. For decades the bias ply tire has been the standard of the domestic tire manufacturer. Controversy, challenge and progress in the tire industry has centered upon the selection of the reinforcing material and the number of plies for bias ply tires.

Possibly to minimize the staggering capital expenses that have heretofore been deemed necessary to provide new equipment expressly adapted for producing the radial tires or even to convert equipment designed to produce the bias ply tire into equipment suitable for producing radial tires, and possibly because the bias ply tire was deemed in some quarters to be even superior to the radial tire, the domestic tire industry has been urging the belted-bias ply tire upon its customers.

Although the first belted-bias ply tire was not introduced until March, 1966, within three years all the major domestic producers were promoting the belted-bias ply tire.

Even in the face of the continued demand being voiced by the purchasing public and the auto manufacturers for radial tires, the tire industry has been relatively slow to respond. Existing tire building drums and curing presses (two major items of capital equipment) use to build the bias ply tire are wholly unsuited for building radial tires according to the customary practice. The costs involved to replace existing equipment with corresponding equipment designed to build radial tires has heretofore been deemed so monumental that all the tire producers have sought to delay any transition as long as possible. As a result, domestic auto manufacturers who are offering radial tires as an item of original equipment or as an option are forced to rely largely on foreign tire manufacturers as their source for radial tires.

In addition to the tire building drums and curing presses, traditional tire building techniques require considerable secondary equipment not only for the making and cutting of tire fabric but also for presenting it most judiciously to the building drum operator.

SUMMARY OF THE INVENTION

It is, therefore, a primary object of the present invention to provide a new and novel construction for radial tire carcasses.

It is another object of the present invention to provide a radial tire construction, as above, which can be fabricated on relatively inexpensive apparatus that does not require traditional secondary equipment.

It is a further object of the present invention to provide a radial tire construction, as above, that can be fabricated on highly simplified building drums and cured in presses adapted for bias ply tires.

It is a still further object of the present invention to provide a new and novel method for fabricating radial tires.

It is a yet further object of the present invention to provide a new and novel apparatus particu;arly adapted for making a radial tire, as above, according to the method hereof.

These and other objects, together with the advantages thereof over existing and prior art forms which will become apparent from the following specification, are accomplished by means hereinafter described and claimed.

In general, the carcass of a radial tire embodying the concept of the present invention has a pair of bead sections with a body section being functionally gripped by and extended toroidally between said bead sections. The body section has at least one ply of an elastomeric material in which a reinforcing means is encapsulated.

Each bead section incorporates at least one bead assembly comprising an annular bead ring means with a flipper anchored thereto — a preferred embodiment employs at least two such bead assemblies in each bead section. In the preferred embodiment the edge portions of the body ply are each sandwiched between and embraced by the pair of flippers anchored to the pair of bead ring means in the corresponding bead sections. The reinforcing means in the ply terminates along the radial extent of the adjacent bead assembly and does not wrap around or otherwise engage the bead ring so that the transfer of forces between the reinforcing means in said ply and the bead ring is accomplished solely by virtue of the overlapping relationship that exists between the flippers and the body ply; in the preferred embodiment this constitutes an embracing engagement of the body ply by the flippers.

A novel method for fabricating the aforesaid tire carcass involves the following steps. A flipper is secured to each of a plurality of annular bead rings to form bead assemblies, and a pair of bead assemblies are positioned on a cylindrical building drum means in axially spaced relation with the flippers extending toward each other along the surface of the drum means. Strips from a ribbon of elastomeric material in which reinforcing means are encapsulated are then deposited on the drum means in parallel relation to the axis thereof and to overlie the flippers previously positioned. A succession of such strips are applied around the circumference of the building drum and stitched together to form a ply and stitched to the flippers to form a composite tire carcass.

Although the foregoing method would complete the most basic embodiment of the present invention, according to the preferred arrangement a second pair of bead assemblies are then positioned, one at each end of the drum means, in axially spaced relation with the bead rings adjacent the bead rings in the previously positioned bead assemblies and with the flippers extending toward each other along the generally cylindrical outer surface of the previously deposited strips forming the ply. These flippers are also stitched to the strips they overlie so that the ply formed by the successive strips is sandwiched between the flippers. A successive layer, or layers, of strips and even a third pair of bead sections may be similarly applied.

One form of an apparatus that is eminently suitable for performing the foregoing method utilizes a guide means to orient a ribbon of uncured elastomeric material on the table of a lead-in mechanism. A shuttle head is adapted to grip at least a portion of the ribbon received on the lead-in table and be translated longitudinally of itself from and to a position above, and aligned with the axis of a building drum means. The shuttle head is further adapted to deposit a strip of the ribbon accurately upon the drum means, and guillotine means sever a strip of predetermined length from the ribbon.

Three alternative constructions of a radial tire carcass embodying the concept of the present invention together with a schematic representation of the unique apparatus adapted to make such tires according to the method hereof are shown by way of example in the accompanying drawings without attempting to show all the various forms and modifications in which the invention might be embodied; the invention being measured by the appended claims and not by the details of the specification.

DESCRIPTION OF THE DRAWINGS

FIG. 4 is an enlarged cross section taken substantially on line 4—4 of FIG. 2 depicting a portion of the drum means on which the tire carcass is assembled and further depicting the components assembled thereon which comprise one embodiment of a tire carcass from which the tire depicted in FIG. 3 would be formed;

FIG. 5 is a top plan taken substantially on line 5—5 of FIG. 4;

FIG. 6 is a view similar to FIG. 4 depicting an alternative manner of stitching the successive strips deposited on the drum means to each other;

FIG. 7 is a perspective view of a portion of a strip of elastomeric ribbon from which the body ply of the subject tire carcass may be fabricated, said strip being partly broken away to reveal one form of a suitable reinforcing material;

FIG. 8 is a view similar to a portion of FIG. 2 and depicting those components assembled thereon which comprise an alternative embodiment of a radial tire carcass according to the subject invention;

FIG. 9 is also a view similar to a portion of FIG. 2 and depicting those components assembled thereon which comprise a further alternative embodiment of a radial tire carcass according to the subject invention;

DESCRIPTION OF THE PREFERRED EMBODIMENTS

Figure 1:
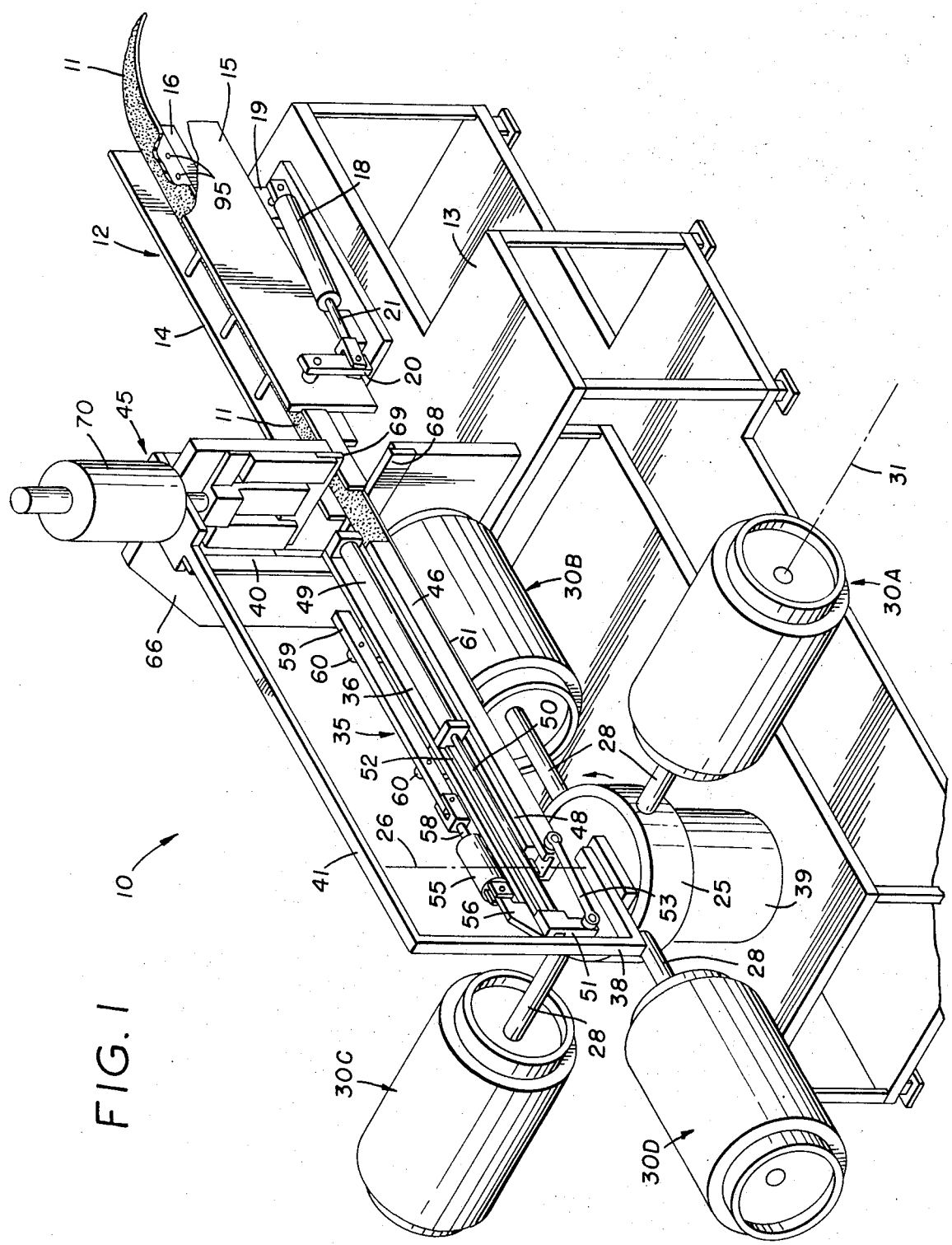
FIG. 1 is a schematic perspective of an apparatus embodying the concept of the present invention and adapted to fabricate a uniquely constructed radial tire carcass according to the method of the invention.
Figure 2:
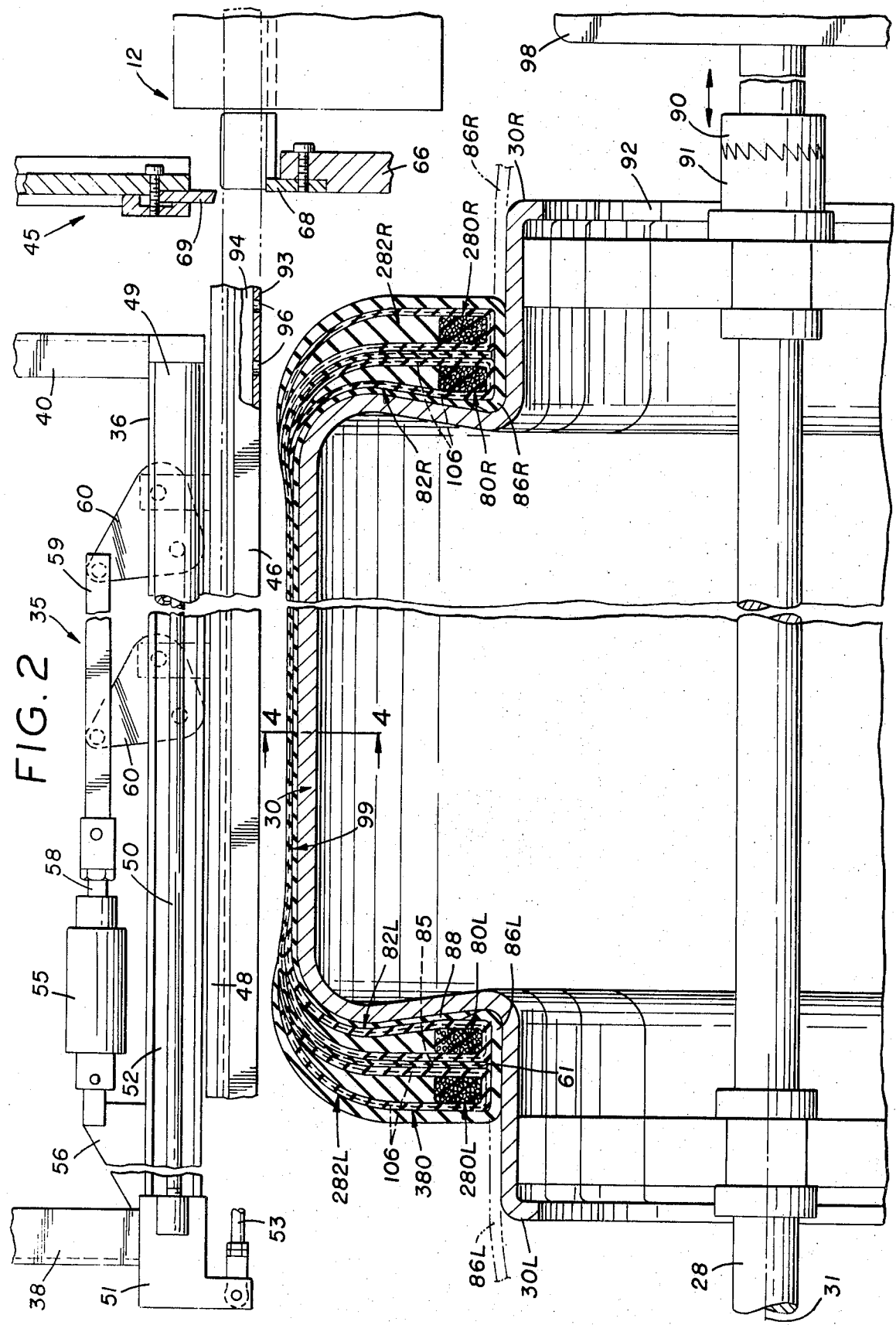
FIG. 2 is an enlarged, side elevation, partially in section, of a portion of the apparatus depicted in FIG. 1.

Apparatus suitable for making a tire carcass embodying the concept of the present invention is designated generally by the numeral 10 in FIGS. 1 and 2 of the attached drawings. A ribbon 11 of reinforced elastomeric material enters, and is received upon, a lead-in mechanism 12 supported on the base frame 13. Lateral side plates 14 and 15 comprise a guide means that preliminarily orients the ribbon 11 on a lead-in table 16 that is vertically movable between the side plates 14 and 15, as by a power cylinder means 18 secured to the fixed pedestal 19 of the lead-in mechanism 12 and operative to actuate a linkage system 20 that connects between the piston rod 21 and the table 16.

A carrousel hub 25 is also mounted on the base frame 13 for rotation about a vertical axis 26. A plurality of angularly spaced spindles 28 extend outwardly of the carrousel hub 25 in a horizontal plane perpendicularly intersected by the vertical axis 26, and each spindle 28 supports a building drum means 30 for rotation about the longitudinal axis 31 of the spindle on which the particular drum means 30 is mounted.

A transfer means 35 is adapted to withdraw a predetermined length of ribbon 11 from the lead-in mechanism 12 and deposit the withdrawn portion of the ribbon at a precisely selected location on that drum means 30 aligned with the lead-in mechanism 12 (station 30B), as is more fully hereinafter explained.

The transfer means 35 is carried by a support beam 36 that spans the drum means 30. The end of the support beam 36 most remote from the lead-in mechanism 12 is secured to a pillar 38 that extends upwardly from the fixed center post 39 about which the carrousel hub 25 rotates. The end of the support beam 36 in closest proximity to the lead-in mechanism 12 is supported by a tie rod 40 that depends from a gantry 41.

That end of the gantry 41 in closest proximity to the lead-in mechanism 12 is supported from the frame of a guillotine means 45, and the opposite end of the gantry 41 is supported by the pillar 38.

A shuttle head 46 is mounted for reciprocation along a slide bar 48 carried on the support beam 36 to be movable longitudinally of itself and, selectively, vertically of itself by first and second actuating means.

A suitable actuating means for effecting horizontal movement of the shuttle head 46 may comprise a double acting cylinder means 49 secured to the support beam 36. The cylinder means 49 selectively extends and retracts a piston rod 50, the outer end of which is secured to a trolley 51 that is slidably mounted on a trackway 52 fastened to the side of the support beam 36. The trolley 51 is, in turn, operatively connected to the shuttle head 46 by a pitman 53 so that actuation of the cylinder means 49 will reciprocate the shuttle head 46 along the slide bar 48.

A suitable actuating means for effecting vertical movement of the shuttle head 46 may comprise a second, double acting cylinder means 55 that is secured to a mounting bracket 56 presented from the support beam 36. The piston rod 58 controlled by the cylinder means 55 is connected to a push rod 59 pivotally secured to a plurality of bell cranks 60 journalled from the support beam 36 and connected to raise and lower the slide bar 48 in response to actuation of the cylinder means 55.

The guillotine mechanism 45 is provided to sever a strip 61 of predetermined length from the ribbon 11 deposited on the drum means 30 at station 30B. The guillotine mechanism 45 is supported from the base frame 13 by a C-shaped subframe 66 that is secured to, and extends upwardly from the base frame 13. A lower, fixed blade 68 is secured to the lower, or bed, portion of the subframe 66 and is opposed by an upper blade 69 movable in response to actuation of a double acting cylinder 70, along the face of the overhead portion of the subframe 66 to effect a cutting action in cooperation with the lower blade 68.

It should be appreciated that the overhead portion of the subframe 66 is spaced upwardly of the bed portion sufficiently to permit the shuttle head 46 to pass between the blades 68 and 69 without interference when they are in their vertically separated positions.

Further details as to the construction of a suitable lead-in mechanism 12, a suitable transfer means 35 and a suitable guillotine mechanism 45 are disclosed in my co-pending application, Ser. No. 256,472, filed May 24, 1972, now U.S. Pat. No. 3,803,965.

In order most expeditiously to impart a full disclosure as to the operation of an apparatus 10 adapted to make the carcass for a radial ply tire according to the method of the subject invention, one should first understand at least the rudimentary components incorporated in the unique construction of a tire shaped from a carcass built on such apparatus and according to the novel method.

Figure 3:
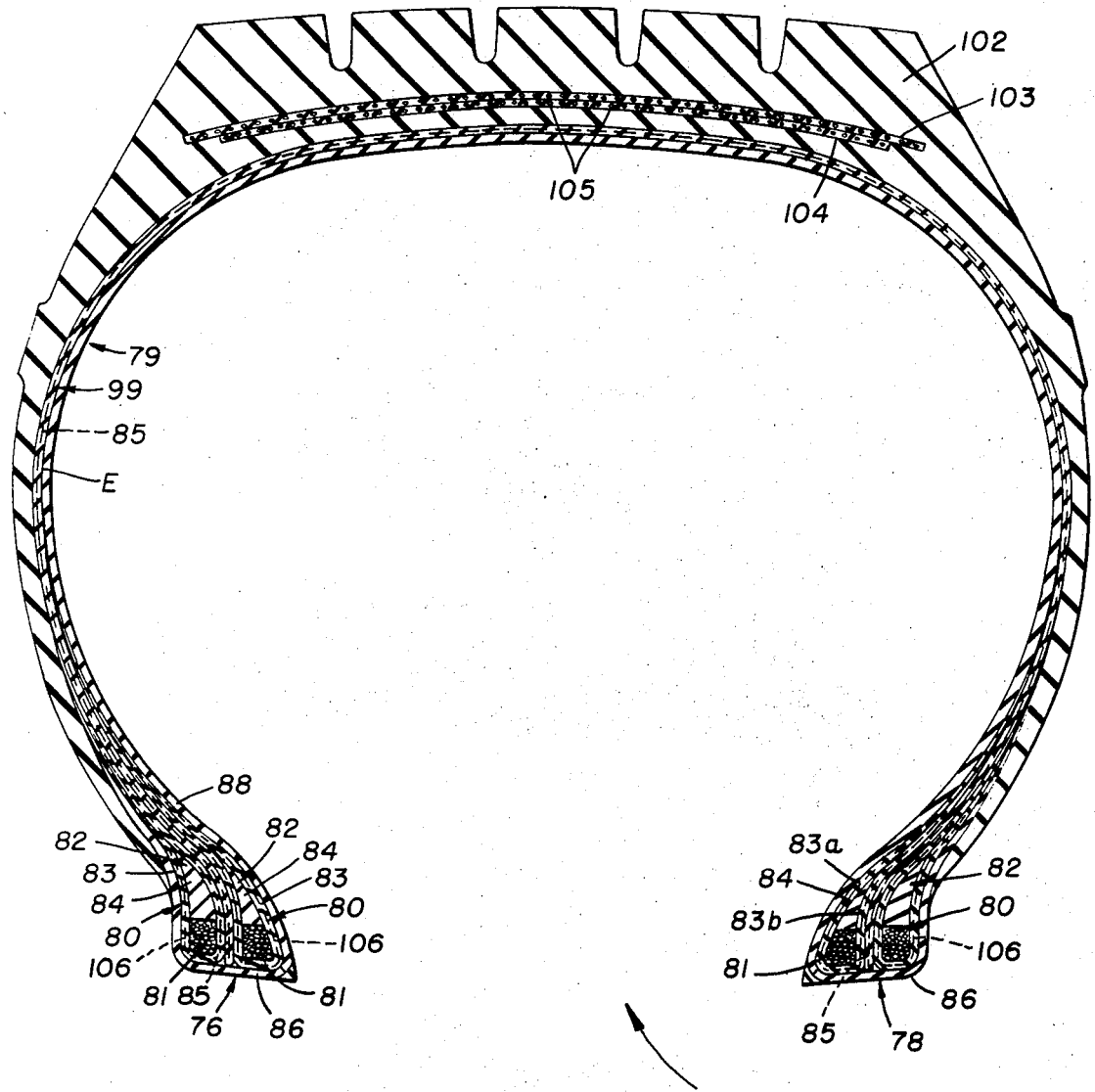
FIG. 3 is a cross-section depicting one embodiment of a uniquely constructed radial tire, the carcass of which is capable of being fabricated according to the apparatus and method of the present invention.

Referring, then, more particularly to FIG. 3, one form of a radial tire embodying the concept of the present invention is designated generally by the numeral 75. In most rudimentary terms the tire 75 has a pair of laterally spaced bead sections 76 and 78 with the ply, or plies, constituting the essence of the body section 79 being functionally gripped by and extending toroidally between the bead sections 76 and 78. In the embodiment depicted in FIG. 3, each bead section 76 and 78 comprises a pair of bead assemblies, and each bead assembly 80 employs an annular bead ring 81 (which may well be of the rectilinear cross-section depicted) with an annular flipper portion 82 extending radially outwardly of the bead ring 81. The flipper 82 comprises that portion of the bead cover fabric 83 extending outwardly of the bead ring 81 and the filler 84 embraced thereby. The bead cover fabric 83 is a reinforced elastic material with the elastomeric material being compounded to provide a stiffer stock than normally used for ply material in order to reduce the tendency for the elastomeric material (as fully cured within a tire) to yield when subjected to the force transfer between the reinforcing material in the body section 79 and that in the bead cover fabric 83 of the flipper portions 82, particularly inasmuch as the reinforcing material 85 in the body section 79 does not wrap around the bead ring 81 in either bead section according to the concept of the present tire construction. As such, the sole transfer of forces between the body section 79 and the bead sections 76 and 78 is occasioned by the overlapping juxtaposition of the body ply, or plies, and the flippers — the effect of the force transfer being enhanced when the body plies are embracingly engaged between flipper portions.

A wide variety of materials are available for use in reinforcing the bead cover fabric 83, but in determining the selection one should bear the major criterion in mind — the modulus of elasticity of the resulting flippers should be compatible with that of the ply, or plies, in the body section 79 of the tire 75 in a direction parallel to the orientation of the reinforcing means in the body section. As such, the reinforcing material in the flippers will preferably be aligned with that in the body section, and the two materials will either be the same or of comparable characteristics.

To form a bead assembly, a length of bead cover fabric 83 is preferably folded to a generally U-shaped cross-section and hooped in an annular configuration with a bead ring 81 received at the base of the "U." A filler 84 may be recieved within the U-shaped fold of the bead cover fabric to engage the bead ring 81 and extend radially outwardly therefrom in a diminishing taper. The arms 83a and 83b of the U-shaped bead cover fabric are juxtaposed to the converging sidewalls of the tapered filler 84. It may well be desirable to cure, or partially cure, the bead assemblies 80 prior to their being assembled on the building drum means 30.

In the embodiment of the tire 75 depicted in FIG. 3, the ply 99 in body section 79 comprises an elastomeric material "E" with reinforcing means 85 embedded therein. Although the body section may be reinforced with a variety of reinforcing material, wire filaments such as first disclosed in my prior U.S. Pat. No. 3,682,222, are particularly well suited for such use. That is, each reinforcing filament delineates a cylindrical helix, and the diameter of said helix is up to approximately three times the diameter of the filament forming the helix. The diameter of the helix and the lay thereof are dimensioned with respect to the diameter of the filament so as to provide no more than approximately 7 percent elongation of the helix within the elastic limit of the filament. The helical configuration of such reinforcing filaments may be accomplished on wire forming mechanism of the type disclosed in my aforesaid U.S. Pat. No. 3,682,222 or on the improved embodiment of wire forming apparatus disclosed in my co-pending application for U.S. Letters Pat., application Ser. No. 104,602, filed Jan. 7, 1971 now U.S. Pat. No. 3,700,012.

Irrespective of the particular reinforcing means 85 employed, the filaments thereof may be encapsulated within a continuous ribbon of elastomeric material by calendering or by passing the filaments through the unique crosshead die of an extruder, as disclosed in my co-pending U.S. application Ser. No. 256,472, filed on May 24, 1972, now U.S. Pat. No. 3,803,965.

The ribbon 11 of reinforced elastomeric material so produced is presented to the lead-in mechanism 12, as depicted in FIG. 1. Elemental strips 61 are severed from the ribbon 11 and joined in lateral succession about the circumference of the building drum means 30 to form the essence of the body section 79 — i.e., ply 99.

In more specific details, the drum means 30 may be advantageously of the collapsible type well known to the industry. The desired number of beam assemblies 80 and a chafer strip 86 are positioned about the spindle 28 on the carrousel side (hereinafter the inboard side 30L) of the drum 30 while the latter is at station 30A and collapsed. A liner 88, if desired, is also positioned about the building drum means before it is expanded. With these components so placed, the drum is expanded, and an inboard chafer strip 86L is positioned (in the chain line disposition) about the inboard end 30L of the drum, as is a first inboard bead assembly 80L. An outboard chafer strip 86R (also in the chain line disposition) and an outboard bead assembly 80R are then positioned about the outboard end 30R of the drum means 30. The inboard and outboard bead assemblies are thereby axially spaced, and the flipper portions 82L and 82R, respectively, on the two bead assemblies are disposed to extend along the surface configuration of the drum means 30 and substantially toward each other in opposed relation about the circumference of the drum means 30. The carrousel then indexes the drum means from position 30A to position 30B at which the drum means is aligned with the lead-in mechanism 12. This alignment is secured by inserting a plunger 90 mounted on the base frame 13 into a receptacle 91 in the nave portion 92 at the outboard end 30R of the drum 30. The plunger 90 and receptacle 91 are preferably mated in a driving connection in order to effect an exact rotation of the drum means 30 in response to a predetermined rotation of the plunger 90 for a purpose hereinafter more fully explained.

Once the drum 30 is locked in alignment with the lead-in mechanism 12, the shuttle head 46 of the transfer mechanism 35 is translated longitudinally of itself from its elevated position above the building drum means 30 to a position above the lead-in table 16. This longitudinal translation of the shuttle head 46 is effected by actuation of cylinder means 49 to retract piston rod 50.

When the shuttle head 46 has been translated to the extent required so that it can grasp a predetermined length of ribbon 11, the shuttle head is stopped and cylinder 18 is actuated to elevate the lead-in table 16 in order to position the ribbon 11 in juxtaposition with the lower face wall 93 of the shuttle head 46.

Although the shuttle head 46 may grasp the ribbon 11 in a variety of ways, it has proven highly satisfactory to provide a plenum chamber 94 within the shuttle head 46 which selectively communicates with a source of subatmospheric pressure, not shown. Because a plurality of apertures 95 in the upwardly directed surface of the lead-in table 16 communicate with the atmosphere and a plurality of apertures 96 through the lower face wall 93 communicate with plenum chamber 94, transfer in the support of the ribbon 11 from the lead-in table 16 to the shuttle head 46 is thereby readily effected.

After the ribbon 11 has been firmly secured against the shuttle head 46, as by the pressure differential between the outer atmosphere and the subatmospheric pressure within the plenum chamber 94, the sequential, reverse actuation of the cylinder means 49 translates the shuttle head longitudinally of itself in a reverse direction — i.e., from its position over the lead-in table 16 to an elevated position above the building drum means 30.

The reverse translation of the shuttle head 46 withdraws an accurately predetermined length of ribbon 11 from the lead-in table 16 and positions it at a precise location above the building drum means 30 — i.e., the length of ribbon gripped by the shuttle head is oriented both in overlapping relation with the flippers positioned with respect to the drum means and in substantially parallel relationship with the axis 31 about which the drum means 30 is rotated. When the shuttle head 46 has withdrawn a precisely predetermined length of ribbon 11 and thus oriented it, the cylinder means 18 and 55 are simultaneously actuated. Cylinder means 18 is actuated to lower the lead-in table 16, and cylinder means 55 is actuated to lower the shuttle head 46 — thereby positively depositing the ribbon at a precisely predetermined location on the building drum means 30 at station 30B.

When the shuttle head 46 has lowered to deposit the ribbon 11 on the building drum means 30, the cylinder 70 is actuated to drive the upper blade 69 downwardly past the lower, fixed blade 68 and shearingly sever an elemental strip 61 from the ribbon 11. Thereupon, the cylinder 70 raises the upper blade 69.

Before raising the shuttle head 46 to its elevated position above the building drum means 30, the plenum chamber 94 is disconnected from the source of subatmospheric pressure, not shown, and is placed in communication with either atmospheric pressure or, to assure a positive transfer of the strip 61 from the shuttle head 46 to the building drum means 30, a source of super-atmospheric pressure, also not shown. Thereafter, cylinder 55 is actuated to raise the shuttle head 46.

With the shuttle head 46 elevated to a position above the building drum means 30 at station 30B, a drive means 98 carried by the base frame 13 is actuated to rotate the plunger 90 through a predetermined degree of angular rotation, thus indexing the drum means 30 about the longitudinal axis 31 of the spindle 28 on which the drum 30 is carried.

The precise degree through which the drum means 30 is rotated is determined by the width of the strips being deposited thereon and the desired relationship each strip is to have with respect to the previously deposited strip. For example, it may be desired: that each strip be butted to the previously deposited strip (not shown); that each strip barely overlap the previously deposited strip (as depicted in FIG. 6); or, that each strip overlap, for example, 50 percent of the previously deposited strip (as depicted in FIGS. 4 and 5). Whereas, the degree of angular rotation through which the building drum means 30 is indexed to receive successive strips 61 is a function of the width of the strip, when considering the respective disposition of successive strips the width determined for each strip must be a function of the building drum circumference. That is, the last, or closing, strip must bear the same relationship to the immediately preceding strip as it does to the initially deposited strip — both of which are contacted thereby when it is deposited on the drum means 30.

With the deposited strips 61 forming a complete layer, or ply, 99 it must be assured that they are uniformly stitched to the flippers of the opposed bead assemblies 80L and 80R previously positioned at the inboard and outboard ends of the building drum. At this juncture, should one wish to utilize a tire carcass employing only a single bead assembly within each bead section, the chafer strips 86L and 86R may be folded back over the conjoined body and head sections, as represented in FIG. 8, and the building drum means advanced to station 30C.

However, should a double bead assembly be desired for each bead section, the second inboard head assembly 280L positioned about spindle 28 for the purpose when the building drum means was positioned at station 30A may be applied to the inboard end 30L of the building drum with the flipper portion 282L thereof stitched to, and overlying, the ply 99, as depicted in FIG. 2. A second outboard bead assembly 280R is also similarly applied to the outboard end 30R of the building drum means with its flipper portion 282R opposing that of bead assembly 280L at the inboard end of the drum and being similarly stitched to, and overlying, the ply 99. In this embodiment, also, the chafer strips are thereupon folded back over the conjoined body and bead sections (from the chain line to the full line representations).

As being exemplary of a still further variation in a tire embodying the concept of the present invention, after the second bead assemblies are applied to the inboard and outboard ends of the building drum means, and before the chafer strips are folded over the assembled components, a second succession of strips may be applied to form a second ply 100, as depicted in FIG. 9. This embodiment permits the application of even a third pair of bead assemblies (inboard bead assembly 380L and outboard bead assembly 380R so that the second ply 100 is embraced between the flipper portions 282L and 282R on the second bead assembly 280 and the corresponding flipper portions 382L and 382R on the third bead assemblies 380L and 380R In this configuration, as well, chafer strips 86L and 86R would be advantageously folded back over the bead assemblies in each bead section.

Irrespective of the number of plies in the body section or the number of bead assemblies in the bead sections, after the last ply has been deposited the carrousel hub may be indexed to move the building drum means 30 to station 30C. At that station the carcass may be removed by collapsing the drum, or additional components, such as selectively expansible belts, additional sidewall stock and tread stock, may be applied. Depending upon the complexity of the operation required at station 30C a further station, such as 30D, may, or may not, be desired. In any event, when the carcass is completed it may be shaped and cured within a press of the type suitable for bias ply tires.

Figure 10:
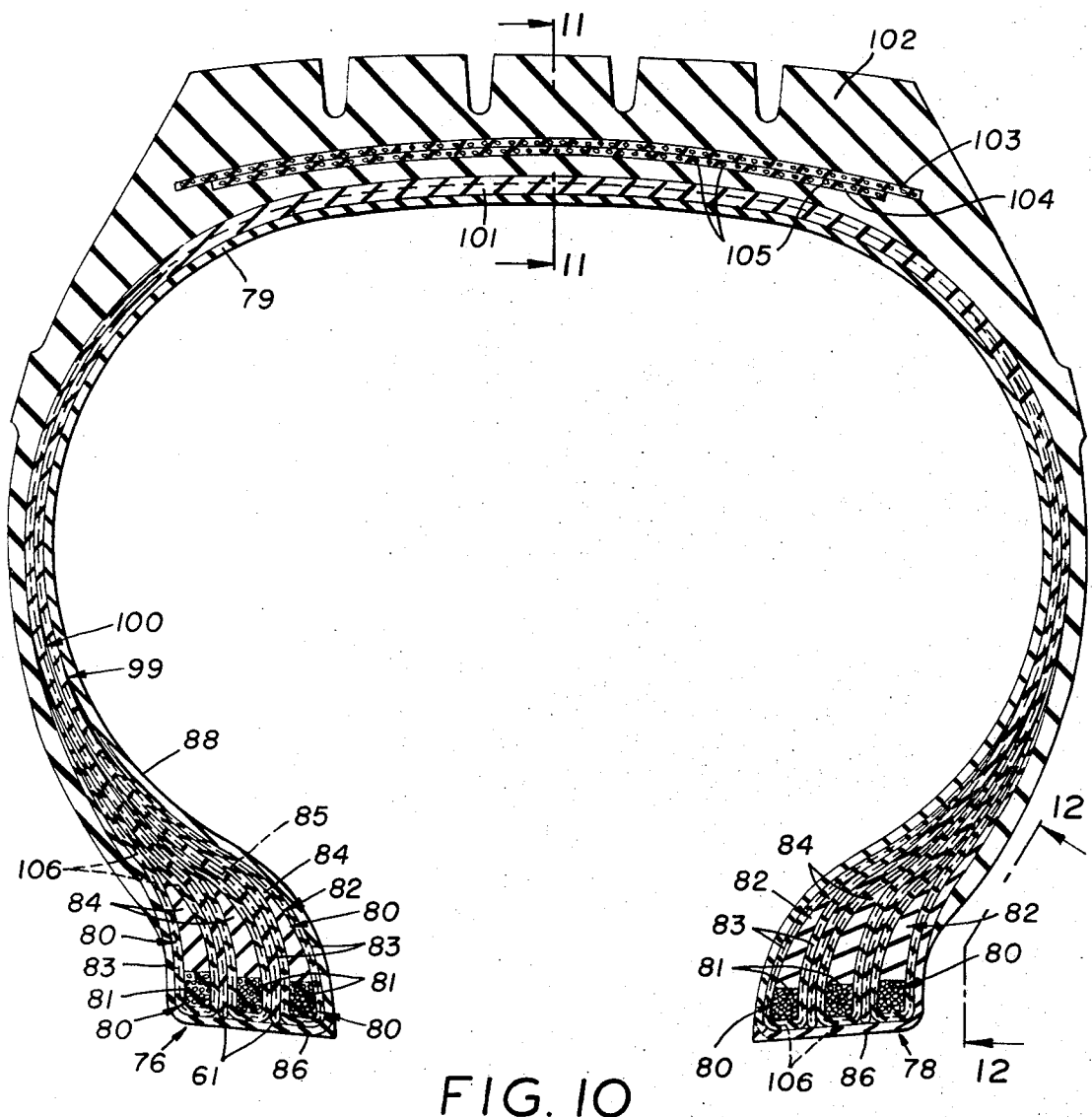
FIG. 10 is a view similar to FIG. 3 depicting a tire formed from the carcass embodiment represented in FIG. 9.
Figure 11:
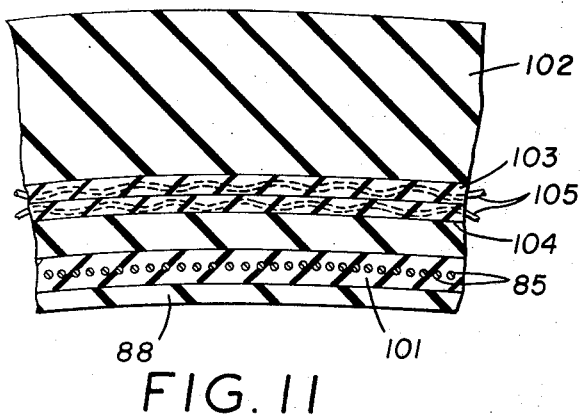
FIG. 11 is an enlarged cross section taken substantially on line 11—11 of FIG. 10; and, FIG. 12 is an enlarged side elevation of a portion of the bead area on the tire represented in FIG. 10 partly broken away to reveal the relative disposition of the reinforcing means in the flipper portion with respect to the reinforcing means in the body ply.

As will be observed by close attention to FIGS. 10 and 11, when the tire is shaped from the cylindrical configuration in which it is formed on the building drum means to its final toroidal configuration, the reinforcing filaments 85, even when two plies 99 and 100 are employed, will tend to dispose themselves within a common cylindrical locus within that portion of the body section 79 radially most remote from the bead sections 76 and 78, as at 101, even though the same reinforcing filaments are laterally spaced in proximity to the bead sections. This phenomenon allows an optimum number of reinforcing ends per inch beneath the tread 102 and belts 103 and 104 without overcrowding the filaments in proximity to the bead sections and thereby permits an ample encapsulation of each individual reinforcing filament within the elastomeric material of the body plies throughout the tire.

It should also be noted that the embodiment of the tire 75 represented in FIG. 3 also employs a pair of reinforced belts 103 and 104 that extend circumferentially of the tire beneath the tread 102 and may be reinforced with respect to their circumferential disposition with filaments 105 similar to filaments 85. The use of the belts not only affords the prior known purpose of maintaining the desired disposition of the tread so as to assure effective ground contact but also restricts radial expansion of the tire — thus contributing to the maintenance of the plies in their disposition with respect to the bead assemblies. The belts 103 and 104, together with the vulcanization of the plies to the bead assemblies, thus effect functional gripping of the ply, or plies, by the bead assembly, or assemblies.

Figure 12:
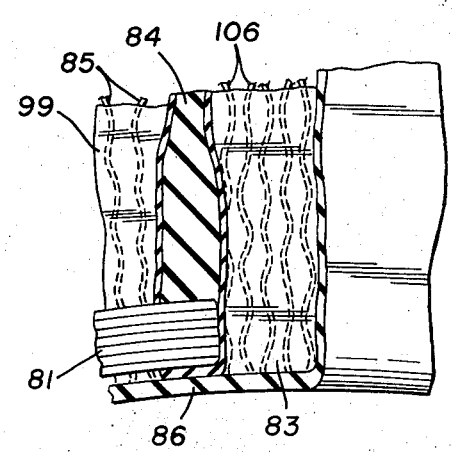

It must be remembered that, as hereinbefore mentioned, the modulus of elasticity of the flipper should be compatible with that of the plies in the body section. A preferred manner by which this result can be accomplished is to employ reinforcing means having comparable moduli of elasticity and disposing the reinforcing means in substantially parallel relation. As best seen in FIG. 12, the bead cover fabric 83 incorporates reinforcing means 106 that are preferably oriented in parallel relation to the radially oriented reinforcing means 85 in the body plies 99 and 100. Although the reinforcing means 106 may, as shown, well also be identical to reinforcing means 85, according to the subject concept they, like filaments 105, are independent and need not be identical.

It should now be apparent that the subject invention provides a unique radial tire carcass construction that is capable of being built according to the method of the invention on relatively uncomplicated, but novel, apparatus and otherwise accomplishes the objects of the invention.

What is claimed is:

1. A tire carcass comprising; a pair of bead sections, a body section having at least two plies gripped by and extending torodially between said bead sections, said body section having at least two plies, reinforcing means encapsulated within each said ply, each said bead section incorporating at least one annular bead assembly, each said bead assembly having an annular bead ring means, a flipper anchored from each bead ring means, the flipper from each bead section overlapping a portion of said body ply in contiguous juxtaposition therewith, the reinforcing means in each said body ply are oriented radially with respect to said bead sections, and the reinforcing means in at least one said body ply lies in laterally spaced relation with respect to the reinforcing means in at least one of the other said plies in proximity to said bead sections, the said reinforcing means being so laterally disposed at the bead sections also converge and lie substantially along a common cylindrical locus within that portion of the body section radially most remote from said bead sections and terminate along the radial extent of said bead assemblies so that the transfer of forces between said ply reinforcing means and said bead ring means is occasioned solely by virtue of the contiguous disposition of said flippers with the body plies.

2. A tire carcass, as set forth in claim 1, in which said flippers have encapsulated reinforcing means, said encapsulated reinforcing means being independent of said reinforcing means in said body ply.

3. A tire carcass, as set forth in claim 2, in which the encapsulated reinforcing means in said flippers are disposed in parallel relation to the reinforcing means in said body ply.

4. A tire carcass, as set forth in claim 3, in which the body ply reinforcing means comprises a plurality of wire reinforcing filaments, each said filament delineating a cylindrical helix, the diameter of said helix being up to approximately three times the diameter of the filament forming said helix, the diameter of said helix and the lay thereof being dimensioned with respect to the diameter of the wire filament so as to provide no more than approximately 7 percent elongation of the helix within the elastic limit of the wire.

5. A tire carcass, as set forth in claim 3, in which the encapsulated reinforcing means in said flippers has a relatively high modulus of elasticity.

6. A tire carcass, as set forth in claim 3, in which each said bead section has at least two bead assemblies, a flipper being anchored from the bead ring means in each bead assembly, a portion of said body ply being embraced by at least one pair of flippers in each bead section so that the transfer of forces between said body ply reinforcing means and said bead ring means is occasioned solely by virtue of the embracing engagement of said flippers with said body ply.

7. A tire carcass, as set forth in claim 1, in which each bead section incorporates at least three bead assemblies in order to present first, second and third flippers within each bead section, at least one body ply being embraced between the first and second flippers and at least a second body ply being embraced between the second and third flippers.

8. A tire carcass, as set forth in claim 1, in which the body ply comprises a series of strips disposed in laterally abutting relation, each said strip comprising a reinforced elastomeric material.

9. A tire carcass, as set forth in claim 1, in which the body ply comprises a series of strips disposed in partially overlapping relation, and each said strip comprising a reinforced elastomeric material.

10. A tire carcass, as set forth in claim 9, in which each strip overlaps approximately 50 percent of the adjacent strip.

* * * * *